United States Patent [19]
Stearns

[11] Patent Number: 5,917,464
[45] Date of Patent: Jun. 29, 1999

[54] COMBINATION OF 2-D DETECTOR ARRAY WITH DISPLAY FOR IMAGE PROCESSING

[75] Inventor: Richard G. Stearns, Los Gatos, Calif.

[73] Assignee: Xerox Corporation, Stamford, Conn.

[21] Appl. No.: 08/325,008

[22] Filed: Oct. 18, 1994

[51] Int. Cl.[6] ..................................................... G09G 3/36
[52] U.S. Cl. ............................................. 345/87; 345/207
[58] Field of Search ..................................... 345/205, 206, 345/207, 97, 104, 87, 98, 100; 382/312, 317, 318

[56] References Cited

U.S. PATENT DOCUMENTS

| | | | |
|---|---|---|---|
| 4,345,248 | 8/1982 | Togashi et al. | 345/207 |
| 4,584,687 | 4/1986 | Howard | 345/207 |
| 5,181,255 | 1/1993 | Bloomberg | 382/257 |
| 5,243,332 | 9/1993 | Jacobson . | |
| 5,263,096 | 11/1993 | Yu et al. | 345/87 |
| 5,276,742 | 1/1994 | Desari et al. | 345/126 |
| 5,483,263 | 1/1996 | Bird et al. | 345/207 |

FOREIGN PATENT DOCUMENTS

| | | |
|---|---|---|
| 0 109 832 A2 | 5/1984 | European Pat. Off. . |
| 0 491 436 | 6/1992 | European Pat. Off. . |
| 0 633 542 A2 | 1/1995 | European Pat. Off. . |
| 6-18846 | 1/1994 | Japan ..................................... 345/104 |

OTHER PUBLICATIONS

Optical Engineering (Jul. 1987), "Tutorial on advances in morphological image processing and analysis", by: Petros Maragos.

Circuits Systems Signal Process, vol. 11, No. 1, 1992, "An Overview of Morphological Filter", by: Jean Serra and Luc Vincent.

Liren Liu: "Optoelectronic Implementation of Mathematical Morphology", Optics Letters, vol. 14, No. 10, May 1989, Washington US, pp. 482–484.

*Primary Examiner*—Xiao Wu
*Attorney, Agent, or Firm*—Fay, Sharpe, Beall, Fagan, Minnich & McKee

[57] ABSTRACT

An image display/processing apparatus which integrates as a single unit a two-dimensional (2-D) display, such as an LCD, with a two-dimensional (2-D) sensor array, such as a photodiode array. The arrays are aligned with a pixel corresponding to a single sensor element of the sensor array. Levels from the sensor elements which have been thresholded to predetermined threshold values are fed-back to the LCD for image display and processing. The LCD image may be moved in a pixel increment by control circuitry to implement morphological image processing.

28 Claims, 5 Drawing Sheets

COMBINATION OF 2-D DETECTOR ARRAY WITH DISPLAY FOR IMAGE PROCESSING

BACKGROUND OF THE INVENTION

The present invention relates to the art of image display and processing. It finds particular application in an image display/processing device for displaying and morphological processing of sensed images.

Various types of image displays have been developed, including liquid-crystal displays (LCDS) which are electronically switched displays making use of changes in the optical properties of liquid crystals in series with an electric field. A thin film of liquid crystals is sandwiched between glass plates imprinted with transparent electrodes. When a voltage is applied selectively across the electrodes, the liquid crystal molecules between them are rearranged or switched in polarization so that light is either reflected or absorbed in the region bounded by the electrodes to form characters or graphics. Liquid crystals are chemical mixtures that behave like crystals in an electric field.

Glass covers of LCDs are assembled with a predetermined space between them to keep a constant distance. They are then sealed around the edges to contain the viscous liquid crystals, and are equipped with polarizing filters to assist in controlling image output.

Most LCDs today employ twisted-nematic field-effect (TNFE) liquid crystals that provide either dark or black characters on a lighted field. When subjected to an electric field, the TNFE molecules twist changing the optical properties of the light thereby varying reflection or transmittance of the light through the LCD. When the voltage is removed, they recover their normal orientation and are transparent to light. The recovery time is called response time.

In large LCD matrix displays, each pixel is commonly a twisted-nematic cell. Each cell is formed as an x-y coordinate matrix of fine width parallel electrodes formed on the crystal sandwich of the opposing glass plates in a liquid crystal sandwich. These electrodes, are formed by the deposition of a transparent conductive film on the inside of each plate and subsequent photolithographic and etching processes.

The glass plates are assembled so that addressable parallel electrodes are at right angles to each other over the liquid crystal material. A pixel is obtained when the voltage pulses across the opposing electrodes and liquid crystal exceed a predetermined voltage threshold. The LCD is organized so that the rows are pulsed cyclically and the data is multiplexed into the columns synchronously.

Large LCD displays based on metal-insulator-metal (MIM) technology are known. Another active matrix technology is thinfilm, transistor-based (TFT-based) displays. These large-panel liquid-crystal displays use a transistor and capacitor at each pixel location to improve contrast and readability. Conventional LCD pixels are driven only by a short voltage pulse during the scanning cycle but active-matrix pixels are driven by a continuous voltage. The transistor and capacitor hold the pulsed-voltage level indefinitely.

As with image display technology, various types of image processing devices have been developed. One aspect of image processing is the need to electronically acquire the image which is to be processed. Arrays of sensing elements such as photodiode and photoconductors have been found to be suited for such image acquisition.

It is also known that amorphous-silicon and poly-silicon based devices have been developed for a wide variety of applications, including image sensors and flat-panel displays. These devices take advantage of certain amorphous-silicon or poly-silicon film properties, such as low-temperature processing capability, high photoconductivity, high field-effect switching ratio and dopability. Moreover, due to the advent of large-area deposition and photolithographic patterning systems, it is common practice to use large substrates to fabricate these devices to improve productivity and gain cost savings.

This large-area device technology has spawned several page-wide linear-array device applications in the fields of facsimile communication, document scanning, and page printing. Page-wide linear sensors using a Si:H have been used for some time in facsimile applications. For example, a-Si:H arrays of photodiodes individually wirebonded to a number of CMOS LSI chips mounted on the same substrate have been developed.

Commonly, sensor arrays employing photodiodes have the sensors positioned in rows and columns of a x-y coordinate configuration in a manner similar to that of LCD arrangements. Such sensor arrays are also driven in a manner corresponding to that of LCD displays.

The present inventor has noted the similarities existing between 2-D image displays, such as LCDs, and 2-D image sensors, such as photodiode arrays when, for example, large-area amorphous-or poly-silicon electronics are employed. The inventor has determined that the combination of these two technologies allows for very powerful image capture, display, and processing. Therefore, the present invention provides for the combination of these technologies through the integration of a 2-D sensor array with a 2-D image display, whereby with appropriate combination a system is constructed for use as an ordinary flat panel display, and which also is capable of parallel image processing such as morphological processing.

SUMMARY OF THE INVENTION

The invention is drawn to an image display/processing apparatus. Accordingly, in one embodiment the invention discloses a single integrated unit including a two-dimensional (2-D) sensor array integrated in a pixel by pixel registration with a two-dimensional (2-D) liquid crystal display (LCD), and associated logic and driver circuitry, for purposes of two-dimensional (2-D) image display and processing. The apparatus is configured to allow morphological image processing operations to be implemented on images displayed on the LCD.

In another embodiment the integrated device is used to provide for document scanning by the 2-D sensor array on a side opposite the LCD.

A further understanding of the nature and advantages of the invention herein may be realized by reference to the remaining portions of the specification and the attached drawings.

DESCRIPTION OF PREFERRED EMBODIMENTS

The technologies involved in two-dimensional (2-D) displays and two-dimensional (2-D) image sensors are quite compatible, especially when large-area amorphous-or poly-silicon electronics are employed. Both technologies use very similar configurations and driving techniques. Typically, one line of these arrays are driven at a time, for LCDs the values for each element in a line are loaded and then the next line is addressed. Similarly, in the sensor array each line is addressed and a value of each element is read out. The combination of the technologies allows for powerful image capture, display, and processing. One application involving the integration of the 2-D sensor array with the 2-D image display allows for a system to be constructed which can be used as an ordinary flat panel display, but which is also capable of powerful morphological image processing.

Figure 1A:
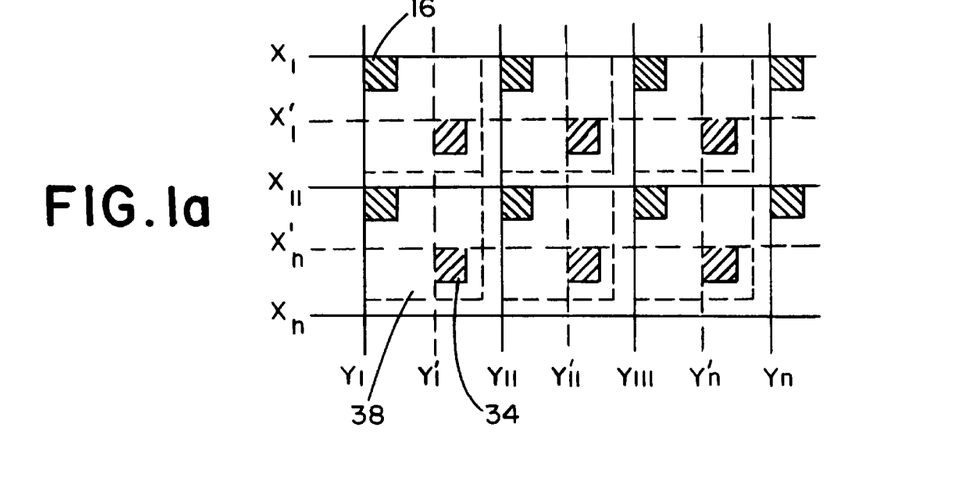
FIG. 1(a) is a top view of an image display/processing apparatus according to the present invention having a LCD and sensor array integrated as a single unit.
Figure 1B:
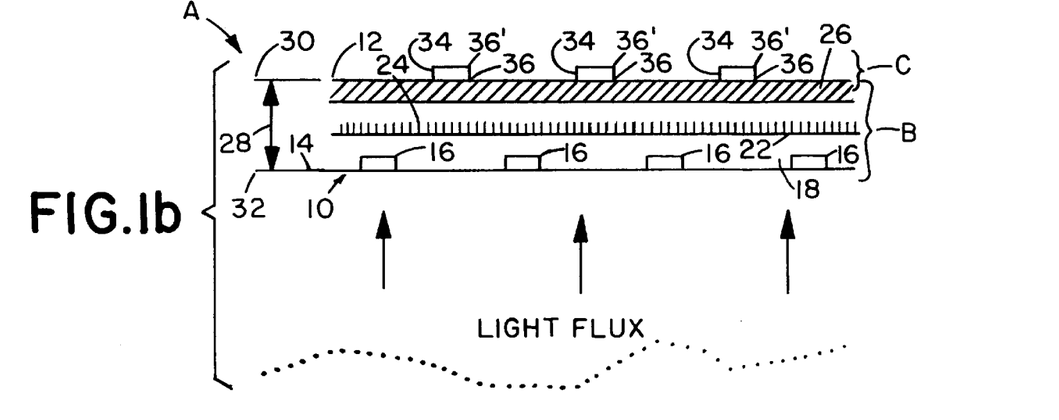
FIG. 1(b) is a cross-sectional view of FIGURE 1(a)

FIGS. 1(a)–(b) provide illustrations of portions of an LCD and photodiode array forming the image display/processing device A of the subject invention. In FIG. 1(a) a top view of a portion of the combined arrays is depicted, while FIG. 1(b) sets forth a cross-sectional view, of FIG. 1(a). To facilitate discussion, with attention to FIG. 1(b), a person using image display/processing device A would be viewing the device from the top of the page down onto the device. A light flux, which acts to illuminate the LCD, is directed to device A on the side opposite that to be viewed.

In the embodiment shown in FIG. 1(b), LCD B and photodiode array C are fabricated on two separate substrates 10, 12. The integrated system is comprised of LCD B configured with amorphous or poly-silicon material on top of which two-dimensional sensor array C is aligned and bonded. The LCD B consists of a glass substrate 10 on whose first side 14 TFT circuitry 16 is fabricated. A layer of liquid crystal material 18 is placed on side 14 on top of the TFT circuitry 16. A thin glass cover plate 22 coated with a transparent conductive coating (e.g. ITO) 24 is placed over the liquid crystal material 18, with ITO 24 acting as a counter electrode for LCD B. A thin polarizing plate 26 is bonded to the ITO coated cover plate 22. Alternatively, the transparent conductive coating may be directly deposited onto the polarizing plate 26.

Appreciating that other LCD constructions may be possible, an important aspect of integrating the LCD B and sensor array C is to maintain the overall gap distance 28 between the sensor array plane 30 and the LCD plane 32 small, on the order of an LCD pixel pitch, in order to obtain acceptable imaging. If the gap distance 28 is too large light diffraction from a pixel increases and spreads out in an undesirable manner, as will be explained in greater detail.

In FIG. 1(b), two-dimensional sensor array C is bonded directly to polarizing plate 26. Sensor elements 34 are bonded to LCD B such that a bottom side 36 which has sensing capabilities is mounted to polarizing plate 26. Through this arrangement sensor elements 34 sense images developed on LCD B. The pitch of the sensor array C is commensurate with that of LCD B, and as more clearly depicted in FIG. 1(a), the two arrays are aligned so that each LCD pixel 38 is to be associated with one corresponding sensor element 34. As previously noted the gap distance 28 is desirably small. Particularly, this distance is to be such that light from one LCD pixel 38 will impinge upon only one associated sensor element of the plurality of sensor elements 34.

As also depicted in FIG. 1(a), LCD TFTs 16 are located at intersections of horizontal lines $X_i$, $X_{ii}$, $X_n$ and vertical lines $Y_i$, $Y_{ii}$, $Y_{iii}$, $Y_n$. Sensor elements 34 are located at intersections of horizontal lines $X'_i$, $X'_n$ and vertical lines $Y'_i$, $Y'_{ii}$, $Y'_n$. In the subject device A the arrays are aligned in relationship to each other such that output from one LCD pixel 38 projects fully onto a corresponding sensor element 34.

It is to be appreciated that to increase the operational speed of device A the display implemented as LCD B can also be configured using ferroelectric display technology, and the TFTs may be laser-crystallized TFTs.

Figure 1C:
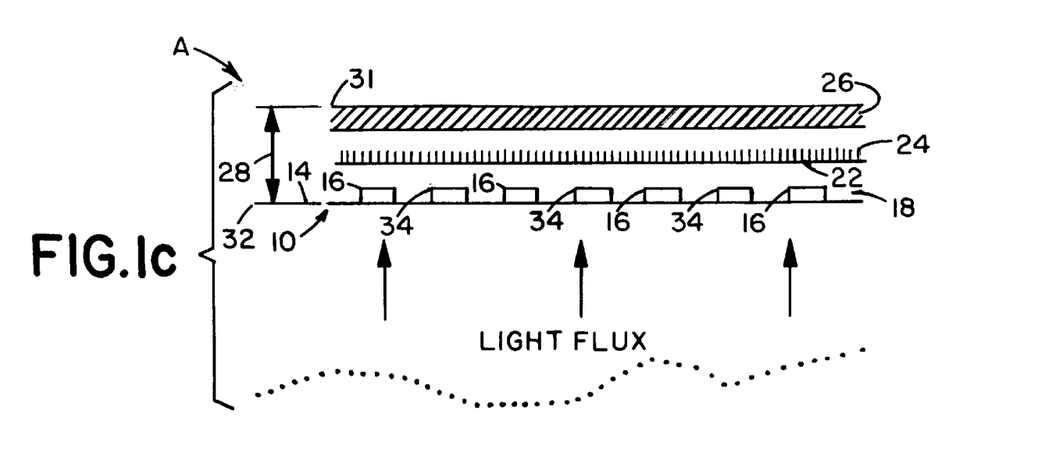
FIG. 1(c) is another embodiment of the present invention with the LCD and sensor array configured on the same substrate.

In another embodiment, as shown in FIG. 1(c), sensor elements 34 are fabricated on the same substrate 10 as TFTs 16. Therefore, in this embodiment only a single substrate is needed and the bonding of the sensor array substrate discussed in connection with FIG. 1(b) is not required. Additionally, in this embodiment sensor elements 34 are fabricated so that the side of the sensor elements 34 which has sensing capabilities is facing towards the top of the page. Also, in this embodiment a partially reflective interface 31 may be included to provide an improved optical path back to sensor elements 34. In this manner sensor elements 34 sense the output of LCD B.

In yet another embodiment sensor elements 34 depicted in FIG. 1(b), are configured to not only have sensing capabilities on bottom side 36 but also on top side 36'.

In the embodiment discussed in connection with FIG. 1(c) and the embodiment immediately above i.e., having sensor elements 34 with sensing capabilities on both bottom 36 and top 36' sides, the subject invention includes the capability of scanning documents located on a side opposite LCD B. The control of such a scanning operation is controlled by implementing known scanning control operations.

For ease of understanding, a plurality of operational properties of the system are defined. It is to be appreciated that while certain characteristics of the system are set forth below, may of these properties may be relaxed and/or implemented in other arrangements. First, a photodiode array is implemented as the sensor array C. It is also possible the sensor array may be constructed using a photoconductor array. Also, driving of LCD B and sensor array C are synchronized, in the sense that whenever the sensor array C is read out, a line of sensor array C is read at the same time as its corresponding LCD line is updated. Thus, in effect, there is a constant time delay for each sensor element 34, between the time that one sensor element 34 corresponding one LCD pixel 38 is addressed and the time that an output of the corresponding sensor element 34 is measured. Typically, LCD response time is much slower than that for photodiode sensors.

A further parameter is that sensor elements 34 may be interrogated after any N frames of integration. That is, sensor elements 34 may be read out each LCD frame update, after two frames of LCD update, etc. For the following discussion transition time of the LCD B will be ignored under the assumption that LCD response time is less than one frame period, so that reading sensor elements 34 for each LCD frame produces meaningful data concerning the LCD output from the previous frame. A frame is defined as the time period it takes for the system to sequence through its operation to again address a previously addressed location, i.e. a pixel. It is a straight forward operation to extend the concepts described below to the case where the LCD response time is a significant portion of a frame period.

Figure 1D:
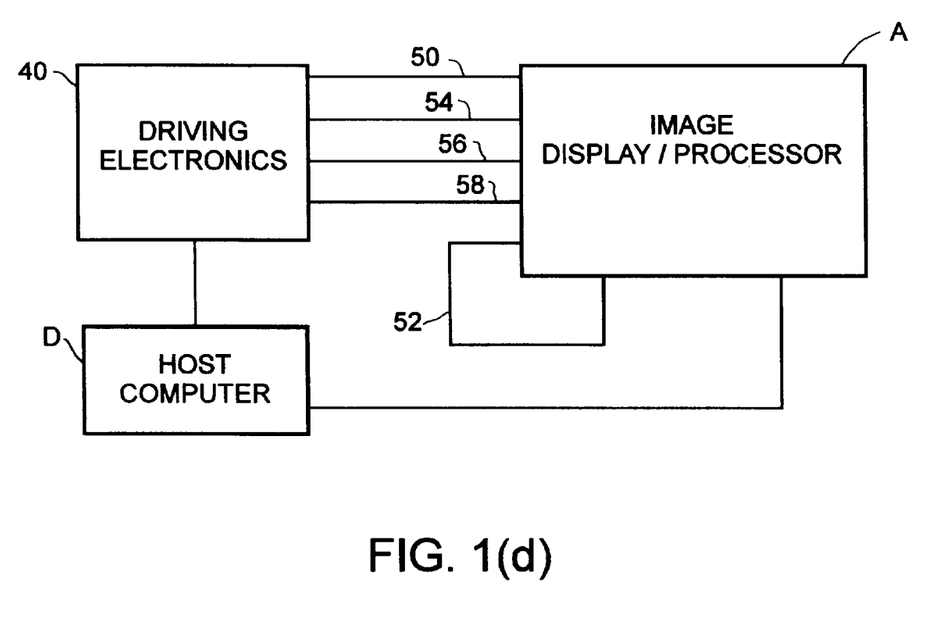
FIG. 1(d) sets forth a block diagram of the image display/processing apparatus arranged for morphological processing.

Attention is now directed to using sensor array C of the image display/processing device A for parallel image processing. To use the subject image display/processing device A for morphological image processing, several attributes as shown in FIG. 1(d) are included. The sensor array C is dynamically programmable to integrate over a specified number of LCD frames using host computer D to control driving electronics 40 to program the sensing elements 34 through integrating signal line 50. It is to be appreciated that driving electronics may be incorporated as part of host computer D.

Sensor array output is fed-back to LCD B for display and processing by feedback lines 52 which are associated with each sensor element 34 and its corresponding pixel 38. This feedback arrangement has very little delay, i.e. on the order of 1 LCD frame. By this arrangement feedback can be accomplished without any need for an intermediate storage of the output from sensor array C. In FIG. 1(d) only one line 52 is shown in order to simplify the figure, however, it is to be appreciated that various known feedback arrangements may be implemented. It is also to be appreciated a storage device can be implemented to provide an intermediate storage if desired.

The levels of the sensor elements 34 of sensor array C are thresholded to binary, with a dynamically programmable threshold level using thresholding line 54 controlled by host computer D.

Finally, driving electronics 40 are selected such that with minimal intervention of the computer D driving LCD B, the image at LCD B can be shifted by one pixel in either the x- or y- directions using LCD shift lines 56 and 58. Shifting the image orthogonal to the scanline direction of LCD B is easily accomplished, as it corresponds to a simple shift in the scanline sequence with respect to the start of a frame. Shifting the image along the scanline direction will depend upon the specific manner in which the LCD B is driven. Using a system as described above, the fundamental morphological processing operations of DILATION and EROSION may be implemented.

Prior to a specific discussion regarding such implementation it is noted that the present discussion deals with binary images. In this context, the term "image" refers to a representation of a two-dimensional data structure composed of pixels. A binary image is an image where a given pixel is either ON or OFF. Binary images are manipulated according to a number of operations wherein one or more source images are mapped onto a destination image. The results of such operations are generally referred to as images. The image that is the starting point for processing is sometimes referred to as the original image.

Pixels are defined to be ON if they are black and OFF if they are white. In some cases a "don't care" pixel can occur which may be either an ON or an OFF pixel.

A "solid region" of an image refers to a region extending many pixels in both dimensions within which substantially all the pixels are ON.

A "textured region" of an image refers to a region that contains a relatively fine-grained pattern. Examples of textured regions are halftone or stippled regions.

AND, OR, and XOR are logical operations carried out between two images on a pixel-by-pixel basis.

NOT is a logical operation carried out on a single image on a pixel-by-pixel basis.

Prior to considering the operation of the image processing in further detail, it may be helpful to briefly define some of the terms that have been adopted for describing "morphological image processing operations".

"Morphological operation" is an operation on a bitmap image (source image) that uses a local rule at each pixel location with the source image to create another bitmap image (destination image). For convenience, the source and destination images sometimes are referred to as "pixel-map" images so that the operational rate can be viewed as operating on each "pixel". "Bitmap" and "pixelmap" are synonymous terms for a data structure of a certain type, and "bit" and "pixel" are used interchangeably to describe the contents of such a data structure.

"Structuring Element" (SE) is an image object, typically of relatively small size and simple shape, for probing the source image to extract information from it through the use of selected morphological operations. The SEs referred to herein are binary SEs. They are illustrated by using solid areas to identify their ON pixels and hollow areas to identify their OFF pixels. Their center locations are identified by a ("X").

A number of morphological operations map a source image onto an equally sized destination image according to a rule defined by a structuring element (SE). The SE is defined by the center location ("X") and a number of pixel locations, each having a defined value (ON or OFF). The pixels defining the SE do not have to be adjacent each other. The center location ("X") need not be at the geometrical center of the pattern and does not even need not even be inside the pattern.

A "solid" SE refers to an SE having a periphery within which all pixels are ON. For example, a solid 2×2 SE is a 2×2 square of ON pixels. A solid SE need not be rectangular.

The following terms are specific to binary morphological operations.

"EROSION" is an operation that is performed by probing a binary source image with a SE to write an ON (1) or an OFF (0) pixel into the destination image for each pixel location within the source image, with the logic level of the pixel that is written at any given location depending upon whether the SE is matched or not by the source image when it is centered on the given pixel location. When the SE to be matched contains both "hits" and "misses," the matching operation commonly is called "hit-miss transform." However, to simplify this disclosure, the definition of EROSION has been expanded to include such hit-miss transforms.

"DILATION" is an operation that is performed by probing a binary source image with a SE to write the SE into the destination image on centers corresponding to the location of all "ON" pixels on the source image. As used herein, DILATION is defined only for "hits" in the SE, so "misses" are ignored. Thus, the dilated destination image is the union of all replicas of the SE translated to all 1-pixels of the source image.

"OPENING" is an operation for replicating a SE in the destination image for each match to the SE in the source image. It is equivalent to an EROSION of a source image by a SE followed by a DILATION of the eroded image by the same SE. In keeping with the foregoing definitions of EROSION and DILATION, the definition of the OPENING operation has been expanded to include an EROSION with a SE containing both "hits" and "misses" followed by a DILATION with only the "hits" in the SE.

"CLOSING" is an operation composed of a DILATION of a source image followed by an EROSION of the dilated image. A CLOSING of an image is equivalent to a bit inversion of an OPENING that is performed on a bit inverted source image. In view of the foregoing definition of DILATION, it will be understood that a CLOSING is defined herein only for "hits" in the SE, so any "misses" are ignored.

Morphological operations are translationally invariant. In other words, a source image may be translated prior to being transformed, thereby causing the result to be translated or shifted by the same amount, without otherwise changing it. This means that these operations may be implemented with a high degree of parallelism because each bit or pixel in the source image is processed in accordance with the same rule.

EROSION, DILATION, OPENING and CLOSING operations performed with SE's consisting of only "hits" are geometrically "increasing" operations. Therefore, if a first image is contained in a second image, any of these operations that are performed with such a SE on the first image will also be contained in the second image. Furthermore, CLOSING is "extensive", and OPENING is "antiextensive". Accordingly, the source image is contained in the destination image when the source is transformed by a CLOSING, and the destination image is contained in the source image when the source image is transformed by an OPENING. The results of OPENING and CLOSING operations are independent of the position of the center of the SE. Moreover, OPENING and CLOSING operations are independent, which means they will not change the transformed image if they are reapplied to it. Other terms that are sometimes used in describing morphological operations are:

a "4-connected region" is a set of ON (1) pixels, such that a path between any two of those pixels can be found that stays entirely within the set of ON pixels and consists of only horizontal or vertical 1-pixel moves, a "8-connected region" is a set of ON (1) pixels, such that a path between any two of those pixels can be found that stays entirely within the set of ON pixels and consists of only horizontal, vertical or diagonal 1-pixel moves.

A "hit-miss" SE is a SE that specifies a non-zero set of ON pixels and OFF (0) pixels, with those two sets being non-overlapping (i.e., non-intersecting). A "weakly" matched filter specifies relatively few pixels of the pixel pattern to which it is matched, while a "strongly" matched filter specifies a large percentage of the pixel pattern to which it is matched.

A "hit-only" SE is an SE that specifies a non-zero set of ON pixels.

"Fillclip" is a morphological operation where one image is used as a seed and is "grown" morphologically, clipping it at each growth step to the second image.

"Fill8" is an image operation in which an 8-connected region is filled to minimum rectangular bounding boxes.

A "mask" refers to an image, normally derived from an original image, that contains substantially solid regions of ON pixels corresponding to regions of interest in the original image. The mask may also contain regions of ON pixels that do not correspond to regions of interest.

The various operations defined above are sometimes referred to in noun, adjective, and verb forms. For example, references to DILATION (noun form) may be in terms of DILATING the image or the image being DILATED (verb forms) or the image being subjected to a DILATION operation (adjective form). No difference in meaning is intended.

The most straightforward approach to binary morphological processing is to define structuring element (SE) $42$ of FIG. 2($a$) having center location $44$. Original image $46$ of FIG. 2($b$) may be ERODED or DILATED according to structuring element (SE) $42$. DILATION corresponds to multiple shifts of the original image $46$ as prescribed by structuring element (SE) $42$, followed by a pixelwise logical OR operation over multiple images. EROSION is the result of multiple inverted shifts associated with structuring element (SE) $42$, followed by a logical AND operation. Original image $46$ of FIG. 2($b$) is shifted according to the location of the black pixels in structuring element (SE) $42$, with respect to center location pixel $44$.

Figure 2A:
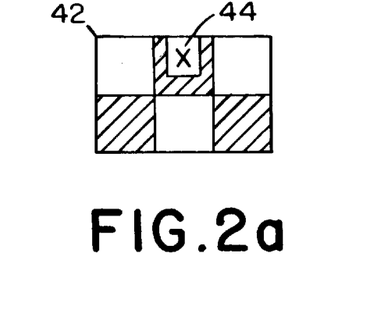
FIGS. 2(a)–2(d) provide illustrations of morphological processing operations.
Figure 2B:
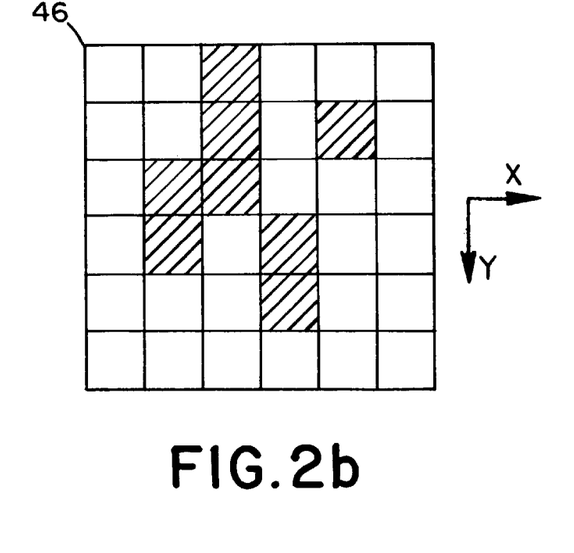
Figure 2C:
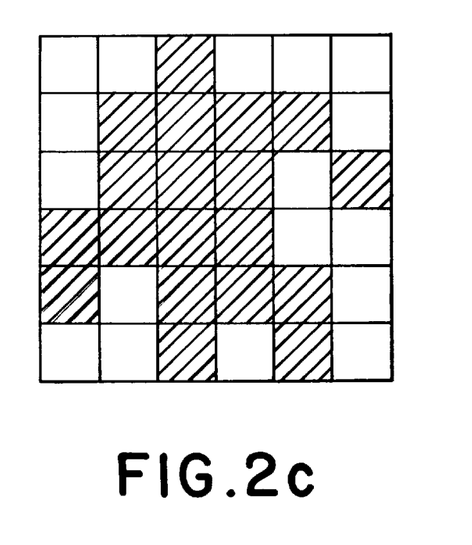
Figure 2D:
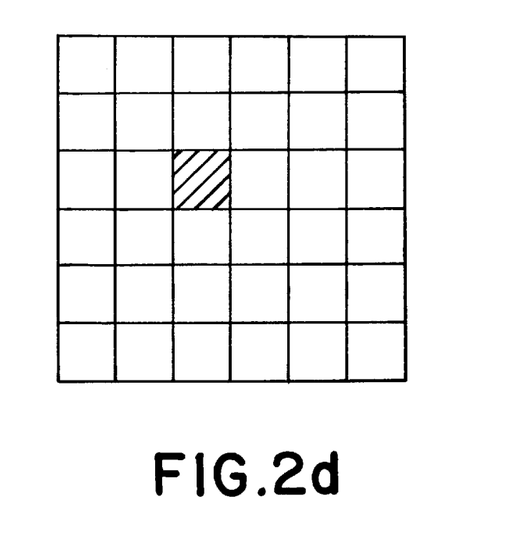

In this case, for DILATION three images are created: the original $46$, a copy shifted by an amount of $(\Delta x, \Delta y)=(1,1)$ and a copy shifted by $(\Delta x, \Delta y)=(-1,1)$. Logical ORing of the image produces the DILATION result shown in FIG. 2($c$). For EROSION the original image undergoes a logical AND operation with image copies by $(\Delta x, \Delta y)=(-1,-1)$ and $(\Delta x, \Delta y)=(1,-1)$. The results of such processing being shown by FIG. 2($d$).

There are a variety of ways to implement morphological processing with image display/processing device A of the subject invention.

Assuming a given structuring element $S(i,j)$, the structuring element (SE) $42$ is described by a series of N translations of the original image $46$. These N translations are denoted by $T_k$, where k runs from 1 to N. For example, the structuring element (SE) $42$ of FIG. 2($a$) could be described by translation $T_1=(1,1)$, $T_2=(-1,1)$, with N=2. Inverted shifts are denoted by $T_{-k}$, i.e. $T_{-1}=(-1,1)$, $T_{-2}=(1,-1)$ in FIG. 2($a$).

Given the translations associated with structuring element (SE) $42$, a DILATION may be performed as described below. The original image (assuming it is binary) is loaded to the LCD B. At the time of loading, the charge of sensor elements $34$ is zeroed. After a time $\Delta T$ (ideally equal to a single frame time of the LCD), the image translated by $T_1$ is loaded. This is done by calling out the desired shift in x and y, which is performed in real time by the LCD driving electronics $40$ through shift lines $56, 58$. After another time $\Delta T$, the levels of sensing elements $34$ of sensor array C are read. Sensor signals will then correspond to the sum of original image and the image shifted by $T_1$. This sensor data is thresholded using thresholding line $54$ so that a level corresponding to a single pixel turned ON in LCD B for a time $\Delta T$ yields a 1. This image is sent to LCD B, while again zeroing the sensor elements $34$ of sensor array C. After a next time $\Delta T$ of this image, LCD B is loaded with the original image $46$, shifted by $T_2$. After time $\Delta T$ of the $T_2$ image, the sensor levels or data is read out, thresholding in the same manner as above. The result will be the DILATED image of FIG. 2($c$).

Figure 3:
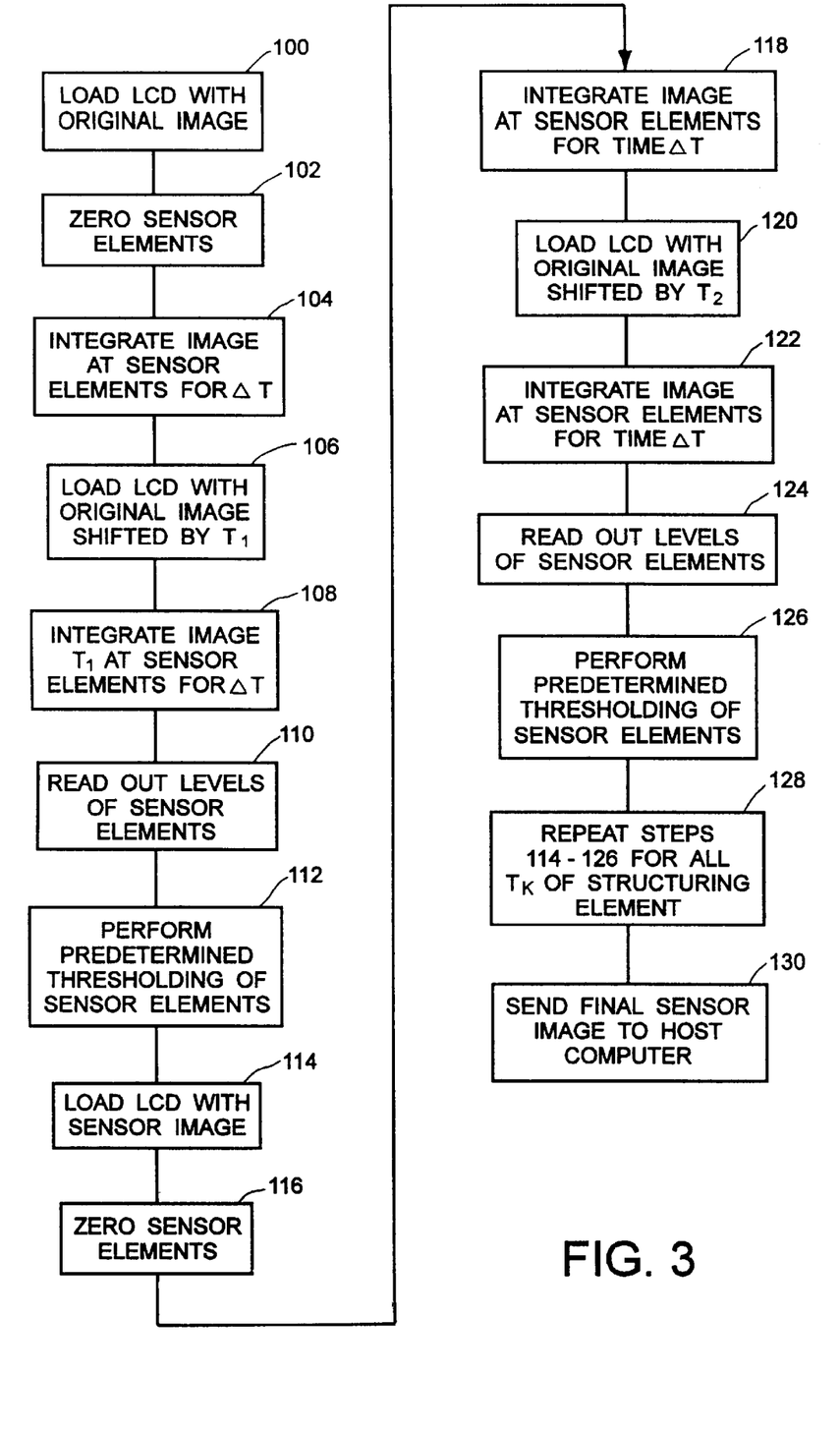
FIG. 3 shows a sequence of operations for processing an image by morphological filtering, according to the present invention.

In the following discussion an "ON" pixel is intended to mean it is in a darkened state. As described in conjunction with FIG. 3, for a series of shifts $T_k$, the following steps are performed:

1. Load LCD with original image, $100$. Zero sensor elements, $102$. Integrate image at sensor elements for time $\Delta T$ (a predetermined LCD frames), $104$.

2. Load LCD with image shifted by $T_1$ (where $T_1$, is a predetermined time period), $106$, integrate image ($T_1$) at sensor elements for time $\Delta T$ $108$, then read out sensor elements, $110$. Threshold sensor data so that a single LCD pixel turned ON for period $\Delta T$ or greater will produce a (1), $112$.

3. Load LCD with sensor image, $114$. Zero sensor elements, $116$. Integrate image at sensor elements for time $\Delta T$, $118$.

4. Load LCD with original image shifted by $T_2$ (where $T_2$ is a second predetermined time period), $120$. Integrate image at sensor elements for time ΔT, 122, then read out sensors, 124. Threshold sensor data so that a single LCD pixel turned ON for period ΔT or greater will produce a (1), 126.

5. Repeat steps 3 and 4, for all $T_k$ of the structuring element (SE), 128. When finished, the final sensor image to host computer, 130.

For EROSION, a comparable set of operations is employed, with shifts $T_k$ replaced by shifts $T_{-k}$, and with the thresholding changed so that a value of 1 is output by the sensor elements only if the signal corresponds to an LCD pixel turned ON, for a period of 2ΔT.

Figure 4A:
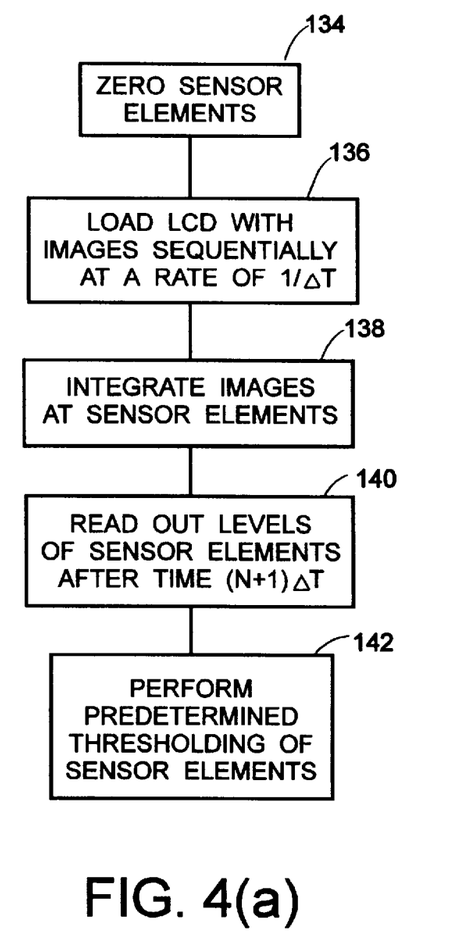
FIGS. 4(a)–4(b) set forth sequences of operations for processing images by morphological filtering according to the present invention.

In the above steps, the sensor elements integrate over pairs of LCD images, and their thresholds are defined independently of the structuring element (SE) (specifically, independent of the number of translations N associated with the structuring element). An alternative approach as illustrated in FIG. 4(a), is to integrate the sensor signal over all translations $T_k$ of the LCD image. In this case, for DILATION, the sensor elements are zeroed, 134, and then LCD images are loaded sequentially, at a rate of 1/ΔT, 136, while the sensor elements integrate the images, 138. After time (N+1)ΔT, the sensor array is read out, 140, and thresholded to a value of (1) if the sensor level corresponds to a pixel being in the ON state of the LCD for a period ΔT or greater, with other signals thresholded to zero, 142.

Figure 4B:
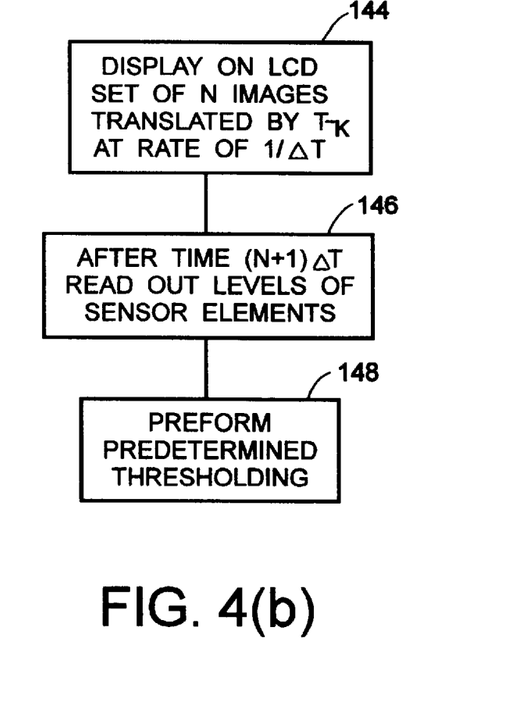

For EROSION, as depicted in FIG. 4(b), the set of N images translated by $T_{-k}$ is displayed on the LCD, at a rate of 1/ΔT, 144. After time (N+1)ΔT, the sensor array is read out, 146, and thresholded to a value of (1) if the sensor level corresponds to a pixel being in the ON state of the LCD for a period (N+1)ΔT, with all other signals thresholded to zero, 148. Using this approach there is no need to load the LCD with a sensor image.

With the capability of performing EROSIONS and DILATIONS, and therefore OPENING and CLOSING operations, many important processing operations may be performed. In addition, image reduction may be accomplished, for example, by sampling the LCD image at every $2^n$ scan of the pixels, and directing this image back to LCD B. This is often a very useful processing operation. Finally, the system subject can be used for grey-scale morphology and processing. The combined display/processing device A could thus be used to perform a wide range of image processing functions with high speed. Many of these functions would be associated with document recognition, manipulation, etc. The system can function as a normal display as well.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

I claim:

1. An image display/processing apparatus for morphological image processing, the apparatus comprising:
    a liquid crystal display (LCD) having an array of thin film transistors (TFTs) positioned in rows and columns, corresponding to a plurality of LCD pixels;
    a sensor array integrated with the LCD as a single unit, the sensor array having a plurality of photodiodes positioned in rows and columns, the array of TFTs and the array of photodiodes aligned with each other to allow a given LCD pixel to project onto a single given photodiode of the array of photodiodes;
    driving circuitry integrated with both the LCD and sensor array comprising addressing lines for independent addressing of the given LCD Pixel and the given photodiode, configured to operate the LCD and sensor array in synchronism;
    a feedback circuit to feedback to the LCD data obtained by the photodiodes representative of a status of the LCD pixels; and
    morphological image processing means to control operation of the integrated LCD and sensor array arrangement based upon said data obtained by the photodiodes.

2. An image display/processing apparatus comprising:
    a liquid crystal display (LCD) having an array of switching elements, corresponding to a plurality of LCD pixels;
    a sensor array integrated with the LCD to form a single unit, the sensor array having a plurality of sensor elements positioned in rows and columns in the array, the array of switching elements and the array of sensor elements aligned with each other to allow a given LCD pixel to project onto a corresponding sensor element of the array of sensor elements; and
    driving circuitry in operative connection with both the LCD and sensor array comprising independent addressing lines to the given LCD pixel and the corresponding sensor element.

3. The apparatus according to claim 2 further including morphological image processing means to control operation of the integrated LCD and sensor array arrangement.

4. The apparatus according to claim 2 wherein the LCD and sensor array are formed on two separate substrates and are then integrated.

5. The apparatus according to claim 2 wherein the LCD and sensor array are formed on a single substrate.

6. The apparatus according to claim 4 wherein a gap between the sensor array and LCD is equal to or less than on the order of an LCD pixel pitch.

7. The apparatus according to claim 4 wherein the sensor elements include sensing capabilities on a first side and a second side, whereby scanning of a document placed on the second side of the sensor elements is achieved.

8. The apparatus according to claim 2 wherein the sensor array is a photodiode array.

9. The apparatus according to claim 2 wherein the sensor array further includes a means for dynamically programming the sensor array to integrate a sensing current.

10. The apparatus according to claim 2 wherein the single unit further includes:
    a glass substrate having the switching elements fabricated thereon as thin film transistors (TFTs);
    a layer of liquid crystal material applied on top of the TFTs;
    a glass coverplate coated with a transparent coating placed over the liquid crystal material;
    a thin polarizing plate bonded on a first side to the transparent conductive coating; and
    said sensor elements having a first side and a second side with at least the first side having sensing capabilities, and the sensing elements bonded, by the first side, to a second side of the thin polarizing plate, whereby the first side of the sensing elements senses towards the LCD.

11. The apparatus according to claim 2 wherein the LCD is a ferroelectric display.

12. The apparatus according to claim 10 wherein the TFTs are poly-silicon TFTs.

13. The apparatus according to claim 2 wherein the sensing elements are a-Si:H sensors.

14. The apparatus according to claim 2 further including a transferring means for transferring an output from the sensor array directly to the LCD, thereby eliminating intermediate storage of sensor element output.

15. The apparatus according to claim 2 wherein the array of switching elements include first addressing electrodes and the array of sensor elements include second addressing electrodes spaced from said first addressing electrodes.

16. A method for displaying and processing an image on an integrated display/processing apparatus comprising the steps:

loading a liquid crystal device (LCD) with image data, the LCD being in the form of an array with LCD switching elements positioned at rows and columns and with a pixel associated with each of the switching elements;

displaying an image by adjusting each of the pixels in accordance with the loaded image data;

sensing data of the displayed image by a sensor array comprised of a plurality of sensing elements located at rows and columns independently addressable from said LCD switching elements, the sensor array integrated as a single unit with the LCD, the sensor array and LCD aligned with each other to allow a given LCD pixel to project fully onto one sensing element of the sensing array;

feeding back data from the sensor array to the LCD based on the data of the displayed image; and processing the feedback data of the displayed image.

17. The method according to claim 16 further including a step of driving the LCD and sensor array by a single driving circuit.

18. The method according to claim 17 wherein the driving step further includes driving the LCD and sensor array in synchronism.

19. The method according to claim 16 further including dynamically programming the sensor array to integrated data obtained by the sensing elements for predetermined length of time.

20. The method according to claim 19 wherein the predetermined length of time is for a specified number of LCD frames.

21. The method according to claim 18 wherein the driving step further includes shifting the image on the LCD.

22. The method according to claim 18 wherein the driving step further includes reading out a line of the sensor array at a same time as a corresponding LCD line is updated.

23. The method according to claim 16 further including morphologically processing the displayed image.

24. The method according to claim 23 wherein the morphologically processing includes:

defining a structuring element;

shifting the image as prescribed by the structuring element to generate multiple shifted images of the original; and performing boolean operations using the original image and the multiple shifted images.

25. The method according to claim 23 wherein the morphologically processing includes, integrating data obtained by the sensing elements over all translations of an original LCD image.

26. The method according to claim 23 wherein the morphologically processing for dilation includes, zeroing the sensing elements;

sequentially loading LCD images at a rate of $1/\Delta T$, where T equals time;

integrating the loaded LCD images;

reading the sensor array after time $(N+1)\Delta T$; and thresholding the sensor array to a value of (1) when a sensor level corresponds to a pixel being in an ON state of the LCD for a period $\Delta T$ or greater, with other signals being thresholded to (0).

27. The method according to claim 23 wherein the morphologically processing, for erosion, includes;

displaying on the LCD, at a rate of $1/\Delta T$, a set of N images translated by a predetermined inverted shift;

reading out the sensor array after a time $(N+1)\Delta T$; and thresholding the sensor array to a value of (1) when a sensor level corresponds to a pixel being in the ON state of the LCD for a period $(N+1)\Delta T$, with other signals thresholded to (0).

28. The method according to claim 16 wherein the displaying comprises addressing the LCD switching elements of the pixels by a first set of electrodes and said sensing comprises addressing the sensing elements by a second set of electrodes.

* * * * *